July 19, 1932.  E. B. BIRKENBEUEL  1,867,871
BUCKET TOOTH
Filed Sept. 23, 1930
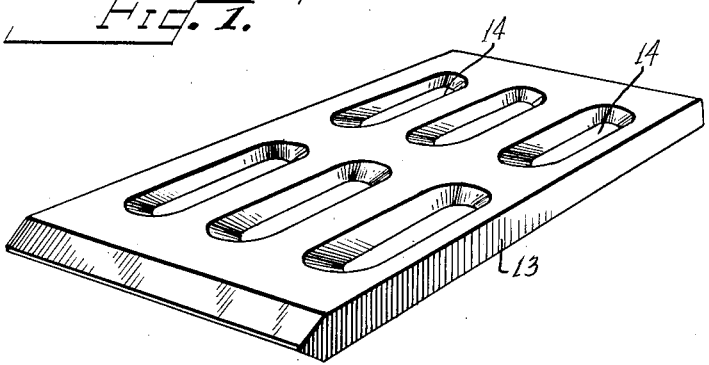
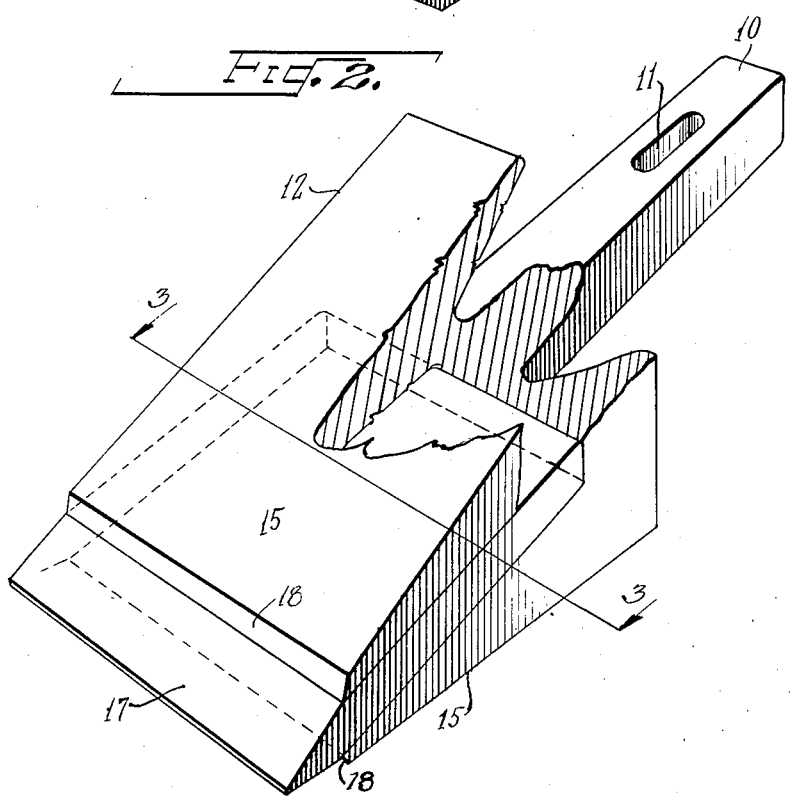
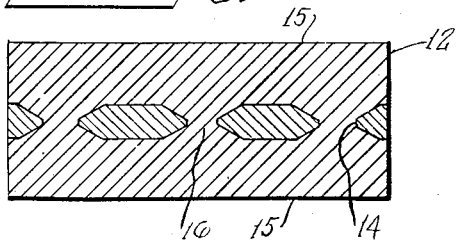
INVENTOR Patented July 19, 1932

1,867,871

UNITED STATES PATENT OFFICE

EDWARD B. BIRKENBEUEL, OF PORTLAND, OREGON

BUCKET TOOTH

Application filed September 23, 1930. Serial No. 483,808.

This invention relates generally to excavating machinery, and particularly to a new form of self-sharpening bucket tooth.

The main object of this invention is to provide an inexpensive form of bucket tooth which will be self-sharpening and simple to manufacture.

This object is accomplished in the manner set forth in the following specification as illustrated in the accompanying drawing, in which:

Fig. 1 is a perspective view of an insert.

Fig. 2 is a perspective view of the bucket tooth with a portion broken away in section.

Fig. 3 is a vertical section taken along the line 3—3 in Fig. 2.

Similar numbers of reference refer to similar parts throughout the views.

Before entering into a description of this invention it will be explained that the cutting portions of bucket teeth are subjected to very severe wear, the best teeth being made from special alloy steels necessarily making same quite expensive, due to the fact that the high grade of material required for the cutting edge is employed to make the entire structure. Such teeth possess a further disadvantage in the fact that they are not self-sharpening. To overcome this object bucket teeth are often made of cheaper steels and their cutting edges built up of high grade steels by means of a welding process. This necessarily involves considerable labor and expense and at the best is relatively temporary.

Referring in detail to the drawing, there is illustrated the ordinary form of bucket tooth consisting of a shank 10 provided with a slotted opening 11, or some other form of a fastening means, and having on one end thereof a wedge shaped tooth 12 along whose longitudinal axis is placed an insert 13, preferably cast from a high grade alloy steel especially adapted for the purpose of withstanding the wear imposed on such devices. The insert 13 is provided with a plurality of slotted openings 14, preferably countersunk (as shown) for the purpose of reducing the amount of high grade steel required, expediting the flow of metal through the insert openings and increasing the tendency to fuse, thereby insuring a more unitary structure.

It can be seen that whether or not this fusion takes place the two sides 15 of the tooth 12 are securely tied together through the insert 13 by means of the metal 16, without which there would be a rapid spreading of the sides 15 under use, which would permit the cutting edge to break off or wear away to a dull point. Whereas under the arrangement above described the lower grade metal of which the tooth 12 is formed wears away much easier than does the cutting edge 17, the bluntness of whose edge, therefore, can never exceed the thickness of the insert 13.

It is preferable, for casting purposes, not to run the edges 18 of the low grade metal of the tooth 12 to a point but to step it off somewhat abruptly (as indicated), since in use this will rapidly wear to a smooth surface.

Attempts have been made to construct teeth with superior cutting elements, as illustrated in United States Patent Number 1,463,725, over which this device is an improvement.

Other attempts have been made to make these cutting points adjustable, but in the present instance the insert which I have described is not adjustable, but its supporting structure is worn away as rapidly as the cutting face is worn away, leaving same relatively sharp and capable of performing the work intended.

Another advantage arising from the use of this construction resides in the fact that a degree of hardness which is desirable for the cutting edge need not be maintained for the supporting edge 18; in fact it is desirable that the edge 18 should wear much more rapidly than does the metal in the insert 13. Obviously, the metal in the insert 13 may be cast or rolled stock, each having certain advantages which are important under special conditions.

It is understood, of course, that the insert 13 is placed in the mold before the metal is poured eliminating the necessity of any machine work whatsoever.

I claim:

A bucket tooth consisting of a blunt point, wedge-shaped, steel casting of low grade steel having a high grade alloy steel insert along the median plane passing thru its blunt point to form an exposed cutting edge extending from side to side of said tooth, said insert having a plurality of laterally spaced countersunk holes formed therein near the cutting edge thru which the low grade metal can pass during the casting operation to join firmly the two portions of the casting adjacent its blunt edge.

EDWARD B. BIRKENBEUEL.